United States Patent [19]

Siegwart

[11] 4,377,188

[45] Mar. 22, 1983

[54] FLEXIBLE CORRUGATED TUBE

[76] Inventor: Emil Siegwart, Michael-Blatter-Strasse 6, 6603 Sulzbach-Neuweiler, Fed. Rep. of Germany

[21] Appl. No.: 232,558

[22] Filed: Feb. 9, 1981

[30] Foreign Application Priority Data

Sep. 19, 1980 [CA] Canada .................................. 360581

[51] Int. Cl.³ ............................................. F16L 11/16
[52] U.S. Cl. .................................. 138/122; 138/135; 138/154
[58] Field of Search ................ 138/122, 154, 135, 136

[56] References Cited

U.S. PATENT DOCUMENTS 4,141,385  2/1979  Siegwart .............................. 138/122

FOREIGN PATENT DOCUMENTS 2127750 12/1973  Fed. Rep. of Germany ...... 138/154
1564933  4/1980  United Kingdom ................ 138/154

Primary Examiner—John W. Shepperd
Attorney, Agent, or Firm—W. R. Hulbert

[57] ABSTRACT

The flexible corrugated tube is made of spirally coiled thin metal strip with corrugations extending parallel to the longitudinal direction thereof, in which tube at least one corrugation of the one side edge of the one convolution (2) lies respectively in at least one corrugation on the other overlapping side edge of the subsequent convolution (3) and the crests of corrugations lying in each other are pressed down by only a part of the corrugation height in such a manner that the corrugation crests are wider than the corrugation cross-section beneath same. In order to provide such a corrugated tube, which is as inexpensive as possible from the point of view of the material required for the production thereof and is also highly flexible and resilient in axial direction, the corrugations with depressed crests have outside the detents (10) sides, or side walls (8), respectively, extending at right angles to, or approximately at right angles to the axis (7) of the tube, whereas corrugations located between same, having no detents, have sides of V-shaped or saw-tooth-shaped cross-section, with sides extending obliquely in relation to the axis of the tube.

18 Claims, 5 Drawing Figures

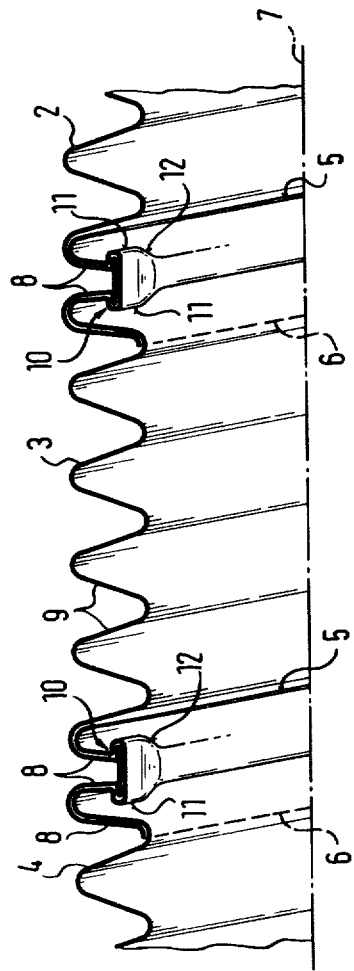
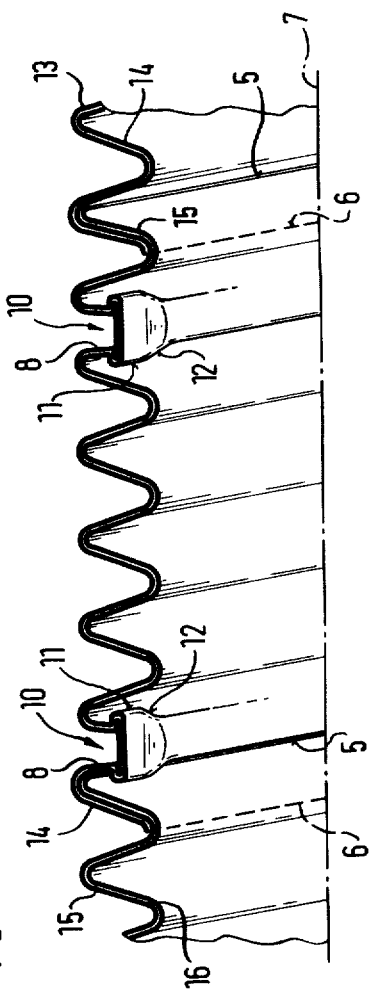
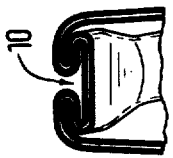
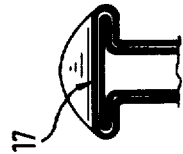

FLEXIBLE CORRUGATED TUBE

The invention relates to a flexible corrugated tube of a spirally coiled thin metal strip with corrugations extending parallel to the longitudinal direction thereof and being essentially round in cross-section, in which tube at least one corrugation of the one side edge of a convolution of the strip lies in at least one corrugation on the other overlapping side edge of the following convolution, respectively.

In corrugated tubes of this kind, successive convolutions of the strip are united at their overlapping edges. This is achieved either by means of folds or by pressing the outwardly directed crests of the corrugations radially into the tube, thus producing a widening of the crests of the corrugations, lying one within the other, of two adjacent convolutions of the strip, resulting in said corrugations hooking into each other. This pressing-in or down of the crests of the corrugations may take place continuously around the entire periphery of the tube or at a plurality of locations separated from each other around the said periphery, and over only a short length thereof.

The known corrugated tubes having strip-convolution connections of the latter type usually have two layers. This is usually achieved in that consecutive convolutions overlap by about half their width. Thus, all corrugations, i.e. those with depressed crests and those without, are provided with sides (flanks) running approximately at right angles to the axis of the tube. The double-layer design of the walls of the tube, and the aforesaid vertical arrangement of the sides thereof, which are necessary in the vicinity of the depressions in order to obtain a rivet-shaped hooking cross-section, use up a relatively large amount of material and thus lead to higher production costs of the tube, which especially increase in that the double-layer design of the tubes requires a thinner strip, which has a higher price per unit of weight than a thicker strip.

The invention is therefore based on the object of providing a corrugated tube of the type mentioned at the beginning, which is as inexpensive as possible from the point of view of the material required for the production thereof and is also highly flexible and resilient in the axial direction. This object is achieved by the construction given in claim 1.

The V-shaped or saw-tooth-shaped cross-section of corrugations which have no detents, and have sides (flanks) running obliquely in relation to the axis of the tube, saves a considerable amount of material. On the other hand, in the case of corrugations comprising detents, the sides in the form of lateral walls, running approximately at right angles to the axis of the tube, ensure that the detents lead to a generally S-shaped crimp in the sides of the corrugations, ensuring hooking together of the corrugations, lying one within the other, of two adjacent strip-convolutions.

In a preferred embodiment, the detents are arranged only here and there, and extend for only short distances around the periphery of the tube. Hereby, at the ends thereof, in the transition area, two-dimensional deformation of the corrugations is produced, which ensures unusually high rigidity in the interlocking of the corrugations, so that the danger of the interlocked corrugations stretching and pulling out of each other is eliminated, even in the case of particularly thin strip in the form of foil.

Thereby, the length of the detents measured in tangential direction of the wall of the tube can correspond approximately with the height of the non-deformed corrugations, i.e. the corrugations without detent. In order not to impair the flexibility of the corrugated tube by the detents, it is advantageous that those corrugations which are respectively adjacent to those corrugations with depressed crests are not deformed at least in the region beside the detents, i.e. are constructed without detents.

For optical and production reasons, the detents can be arranged only in troughs, directed towards the interior of the tube, of interlocking corrugations, and can be formed only by pressing the crests of the corrugations radially towards the exterior of the tube. However, a reversed construction is possible.

The corrugations having V-shaped or saw-tooth-shaped cross-section preferably have approximately the same crest width, but at the base of the corrugations have larger cross-sectional width than for example the corrugations with detents having sides or lateral walls, respectively, extending at right angles to, or almost at right angles to the axis of the tube. The corrugated tube is preferably constructed in one layer between the corrugations having the detents, its successive convolutions overlapping by less than half their width.

Further details of the invention may be taken from the following description of advantageous examples of embodiments illustrated in the drawings:

FIG. 2 is a longitudinal section, to a larger scale, through this example of embodiment (a longitudinal axial section) illustrating the detents formed on the crests of the corrugations which are directed toward the axis of the tube.

FIG. 3 is a longitudinal axial section through another example of embodiment of the tube according to the invention, to the same scale as in FIG. 2.

FIG. 4 is a partial section through a detent in two interlocking corrugations, in another example of embodiment, in the axial direction of the tube.

FIG. 5 is a partial section through a detent in two interlocking corrugations of another example of the embodiment of the invention which detent is on a crest directed toward the exterior of the tube.

Figure 1:
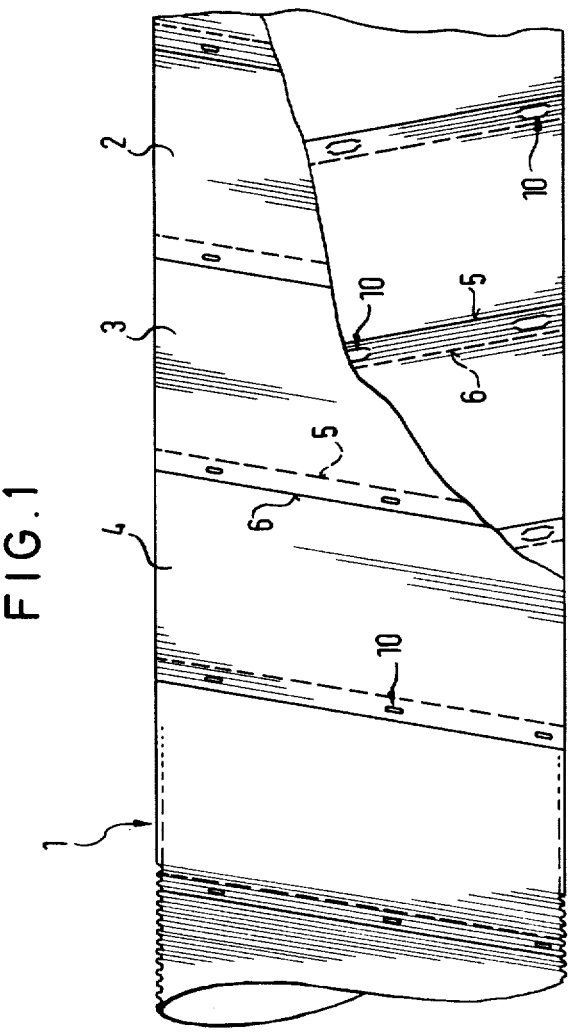
FIG. 1 is a side elevation of a section of one form of execution of the tube according to the invention, the front wall being partially broken away at the right-hand end of this section, in order to reveal the interior of the tube.

In the example of embodiment illustrated in FIGS. 1 and 2, the edges of corrugated-strip convolutions 2, 3, 4 of tube 1 overlap, in the axial direction of the tube, by only about 1½ corrugation-lengths, a portion of convolution 2 overlapping a portion of convolution 3, and so on. Thus about 1½ corrugations of convolutions 2 lie within 1½ corrugations in one edge of adjacent convolution 3. 1½ corrugations of the other edge thereof again lie in 1½ corrugations of next convolution 4. Only in this relatively short overlap does the tube have two layers, whereas between the two overlaps it has only one layer, as shown in FIG. 2. The edges of the overlaps of the convolutions 2 and 3 are marked 5 and 6 and each is located in a corrugation of an adjacent convolution in such a manner as to be supported both radially and axially therein, as shown in the drawing. Whereas the overlapping corrugations, located at the edges of convolutions 2, 3, 4, have sides 8 running approximately at right angles to axis 7 of the tube, the corrugations located between the edge corrugations of convolutions 2, 3, 4 have sloping sides 9, and thus produce corrugations of approximately V-shaped or saw-tooth-shaped cross-section. This ensures a satisfactory joint between interlocking corrugations in the overlap area. The greater width of the corrugations in the central areas of convolutions 2, 3, 4 not only saves material, but also make the tube more resilient in the axial direction.

In order to prevent interlocking corrugations, at the edges of convolutions 2, 3, 4, and having sides 8 running at right angles to axis 7 of the tube, from coming apart, the crests thereof, lying one within the other and directed towards the interior of the tube, are pressed outwardly only at certain spots, i.e. over small parts of the periphery of the tube. This produces rivet-shaped deformations 10 in these crests, causing the walls thereof to bulge or buckle outwardly as at 11. This deformation of the crests is carried out in such a manner that the resulting, expanded, flattened crest-area extends to about half the height of the undeformed corrugations. The area of transition between detent 10 and the adjacent undeformed area of the interlocking corrugations is marked 12.

These detents 10, in the inwardly directed crests of the corrugations, which extend over only short distances around the periphery of the tube, produce local interlocking or hooking together of the corrugations, lying one within the other, of adjacent convolutions 2, 3, 4, with two-dimensional deformation in transition-area 12 between the undeformed parts of these crests and the deformed crests of the corrugations. This ensures unusually high stability in the hooking together of the corrugations, thus eliminating the danger of the hooked-together corrugations expanding and sliding apart, even in the case of a tube made of particularly thin, corrugated metal foil.

The example of embodiment of the tube according to the invention, illustrated in FIG. 3, differs from that according to FIGS. 1 and 2 mainly in that the tube is in two layers over its entire length, i.e. in the central areas of convolutions 13, 14, 15, 16 also. This is achieved in that successive convolutions overlap by about half of their width. In the design illustrated in FIG. 3, this is done with seven corrugations. There are three layers of tube only between left-hand edge 6 of convolution 13 and right-hand edge 5 of the next but one convolution 15.

For the rivet-like hooking together of the directly successive convolutions (e.g. 15 and 14), the crest lying directly beside the overlap region of one convolution (e.g. 16) with the next but one convolution (e.g. 14) and directed towards the interior of the tube are pressed down respectively over a short length of the periphery of the tube towards the exterior of the said tube in such a manner that bulges 11 leading to the hooking together result in the sides 8 following these crests. In order to permit the said bulges in the region of these detents 10, the sides subsequent to the depressed crest extend, contrary to the sides of the other corrugations, approximately at right angles to the axis 7 of the tube, as is also the case in the example of embodiment according to FIGS. 1 and 2.

It is quite possible that in producing detents 10, the cross-sectional shape of the corrugation thus deformed may not be exactly the same as that shown in FIGS. 1 and 2, in that the bulges may be less angular, thus producing sides of which the cross-sectional shape is approximately that of an S.

In the design illustrated in FIG. 4, outwardly directed detents 10 of the crests, directed towards the interior of the tube, of two corrugations lying one within the other, are so deep that they extend practically as far as the crests of the adjacent, outwardly-directed corrugation-crests.

In both examples of embodiment, the lateral edges 5,6 of the convolutions lie respectively in one corrugation trough in such a manner that they are supported in the direction of the axis 7 of the tube in this corrugation trough. Thus, the convolution edges 6 located on the outer side of the tube, on the left-hand side in FIGS. 2 and 3, lie in a corrugation trough seen from the outside, the convolutions being curved further at these edges so far into this corrugation trough that the axial support of the edges in this trough is provided. On the other hand, the convolution edges 5 lying towards the interior of the tube, on the right-hand side in FIGS. 2 and 3, lie in a corrugation trough seen from the inside of the tube, and are also curved at their edge into this corrugation trough in order to ensure the axial support in the said trough.

In the embodiment shown in FIG. 5 the detents are shown as formed in the radially outwardly (i.e. exteriorly) facing crests 17 of the overlapped corrugations.

I claim:

1. A flexible corrugated tube (1) of a spirally coiled thin metal strip having corrugations extending parallel to the longitudinal direction thereof, in which tube at least one corrugation of the one side edge of a strip convolution (2) lies in at least one corrugation on the other overlapping side edge of the subsequent convolution (3), and small sections of the crests of corrugations lying one within the other are pressed down with respect to said crests by only a part of the corrugation height to become detents (10) in such a manner that the corrugation crests are wider than the corrugation cross-section located beneath same, characterized in that the corrugations having depressed crests have sides (flanks) or lateral walls (8), respectively, outside the detents (10) at right angles to, or approximately at right angles to the axis (7) of the tube and corrugations located therebetween having no detents have a V-shaped or saw-tooth-shaped cross-section with sides or lateral walls (9) extending obliquely to the axis of the tube.

2. A corrugated tube according to claim 1, characterized in that crests of the corrugations having V-shaped or saw-tooth-shaped cross-section are spaced further from each other to provide a larger cross-sectional width than those of the corrugations having detents (10).

3. A corrugated tube according to claim 1, characterized in that the crest width of the corrugations with V-shaped or saw-tooth-shaped cross-section is approximately the same as the crest width of the corrugations with vertical or almost vertical lateral walls.

4. A corrugated tube according to claim 1, characterized in that the corrugations having detents (10) are arranged at the edges of the convolutions (2,3,4,13,14,15,16) and the corrugations having V-shaped or saw-tooth shaped cross-section lie in the central region of the convolution.

5. A corrugated tube according to claim 1, characterized in that it is constructed in one layer between the corrugations having detents (10), i.e. its successive convolutions overlap by less than half their width.

6. A corrugated tube according to claim 1, characterized in that it is constructed in a plurality of layers between the corrugations having the detents (10), the successive convolutions (2,3,4,13,14,15,16) overlapping by at least half the convolution width.

7. A corrugated tube according to claim 1, characterized in that the detents (10) are arranged on corrugation crests directed towards the axis (7) of the tube.

8. A corrugated tube according to claim 1, characterized in that the detents (10) are arranged on the corrugation crests directed towards the exterior of the tube.

9. A corrugated tube according to claim 1, characterized in that the detents (10) are arranged at a plurality of locations separated from each other around the periphery of the tube, each detent extending over only a short length measured in a tangential direction of the wall of said tube.

10. A corrugated tube according to claim 9, characterized in that the length of the detents (10) measured in tangential direction of the tube wall corresponds approximately with the radial height of the undeformed (not depressed) corrugations.

11. A corrugated tube according to claim 1, characterized in that the corrugations adjacent to the corrugations with depressed crests respectively are undeformed respectively conconstructed without detents at least in the region beside the said detents (10).

12. A corrugated tube according to claim 1, characterized in that the corrugation crests are pressed down by about half, or more than half the height of the undeformed (not depressed) corrugations.

13. A corrugated tube according to claim 1, characterized in that the side edges (5,6) of the convolutions (2,3,4,13,14,15,16) lie in one corrugation trough, respectively.

14. A corrugated tube according to claim 13, characterized in that the edges (5,6) of the convolution (2,3,4,13,14,15,16) lying in one corrugation trough are bent into the receiving corrugation trough of the adjacent convolution in such a manner that a support for this convolution edge in this corrugation trough in the direction of the axis (7) of the tube results.

15. A corrugated tube according to claim 13, characterized in that the corrugations, in the troughs of which the lateral strip edges lie, are undeformed, i.e. have no detents (10).

16. A corrugated tube according to claim 15, characterized in that the detents (10) are arranged in the corrugations located directly beside those corrugations in the troughs of which the strip edges (5,6) lie.

17. A corrugated tube according to claim 1, characterized in that the sides of the corrugations having detents (10) extend at an angle of at least 80° to the axis (7) of the tube.

18. A corrugated tube according to claim 1, characterized in that the sides of the corrugations having no detents (10) extend at an angle of 40° to 70° to the axis (7) of the tube.

* * * * *